United States Patent [19]

Shibuta et al.

[11] 4,451,410
[45] May 29, 1984

[54] PROCESS FOR PREPARING CONDENSED POLYALKOXYPHOSPHAZENE

[75] Inventors: Osamu Shibuta, Tokushima; Tetuo Hasegawa; Jun Ogawa, both of Naruto, all of Japan

[73] Assignee: Otsuka Chemical Co., Ltd., Osaka, Japan

[21] Appl. No.: 413,686

[22] Filed: Sep. 1, 1982

[30] Foreign Application Priority Data

Sep. 5, 1981 [JP] Japan .................................. 56-140127

[51] Int. Cl.$^3$ .............................................. C07F 9/40
[52] U.S. Cl. .............................. 260/973; 260/927 N
[58] Field of Search ........................... 260/973, 927 N

[56] References Cited

U.S. PATENT DOCUMENTS 3,957,927  5/1976  Wurmb et al. ....................... 260/973

Primary Examiner—Anton H. Sutto
Attorney, Agent, or Firm—Armstrong, Nikaido, Marmelstein & Kubovcik

[57] ABSTRACT

A process for preparing a condensed polyalkoxyphosphazene by reacting a halophosphazene oligomer with an alcohol in the presence of an alkali metal carbonate to produce a condensed partially alkoxy-substituted phosphazene, removing water produced in the reaction from the reaction mixture, and reacting the condensed partially alkoxy-substituted phosphazene with an alkali metal alkoxide. The condensed polyalkoxyphosphazene having desired average molecular weight and viscosity and an excellent stability can be easily prepared in a high yield in a low cost.

9 Claims, No Drawings

PROCESS FOR PREPARING CONDENSED POLYALKOXYPHOSPHAZENE

BACKGROUND OF THE INVENTION

The present invention relates to a process for preparing condensed polyalkoxyphosphazenes.

Polyalkoxyphosphazenes are compounds having a cyclic or linear structure consisting of P and N into which organic substituent groups, i.e. alkoxyl groups, are introduced. The substituent groups can be suitably selected so as to raise the compatibility with various organic polymeric materials, and the polyalkoxyphosphazenes are employed as an additives for imparting the flame or fire resistance to the organic polymeric materials to improve the flammability thereof. In addition to the use as a flame retarder, the polyalkoxyphoshpazenes are also useful for other uses utilizing the properties thereof, e.g. chemical stability, low temperature property, lubricating property and electric property.

It is well known, as reported by Masaaki Yokoyama in Nippon Kagaku Zasshi, Vol. 80, No. 10, 1192(1959), that polyalkoxyphosphazenes are synthesized from phosphonitrilic halide oligomers, e.g. phosphonitrilic chloride oligomers, and alcohols. In a preferable embodiment of this process, phosphonitrilic chloride trimer is added to a reactor with a tertiary amine such as pyridine as a hydrogen chloride acceptor, and is estrified by introducing an alcohol to the reactor, as shown in the following reaction scheme:

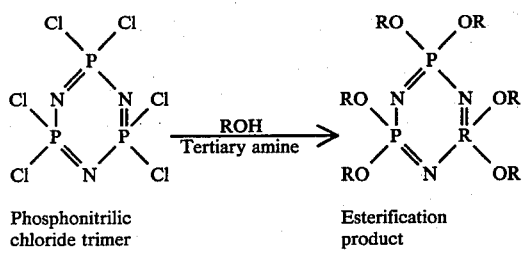

Phosphonitrilic chloride trimer → Esterification product

In this process, polycondensation reaction also occurs in addition to the esterification reaction. Accordingly, a condensed polyalkoxyphosphazene is also produced, as shown in the following reaction scheme:

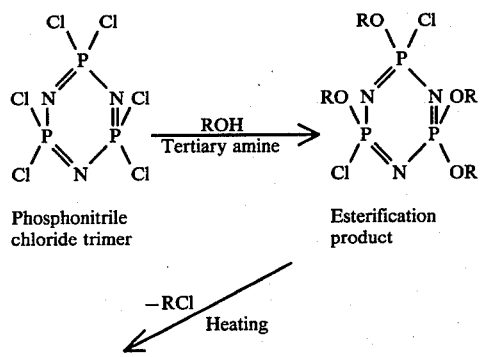

Phosphonitrile chloride trimer → Esterification product

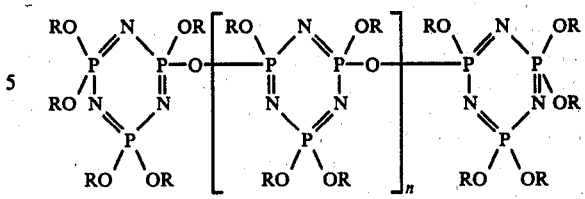

Polycondensation product

It is known that the condensed polyalkoxyphosphazenes are more effective as a flame retarder, for instance, for use in rayon, than noncondensed polyalkoxyphosphazenes, as disclosed in Japanese Examined Patent Publication (Tokkyo Kokoku) No. 17772/1980 and Japanese Unexamined Patent Publication (Tokkyo Kokai) No. 109320/1974 and No. 13900/1976.

The preparation of the condensed polyalkoxyphosphazenes using a tertiary amine has been made by a process in which a complete esterification product of a phosphonitrilic halide oligomer is prepared once and it is reacted again with the phosphonitrilic halide oligomer at a temperature of 50° to 200° C., as disclosed in Japanese Examined Publication No. 17772/1980, or a process in which a phosphonitrilic halide oligomer is partially esterified with an alcohol and is then reacted in the presence of a tertiary amine base at a temperature not less than 20° C., as disclosed in Japanese Unexamined Patent Publication No. 109320/1974 and No. 13900/1976. The tertiary amine acts not only as a hydrogen halide acceptor, but also as a catalyst for polycondensation. Accordingly, the process using the tertiary amine has the disadvantage that it is difficult to control the molecular weight and viscosity of the reaction product. Attempts of the improvement on reaction conditions or process steps have been made in order to control the over-polycondensation due to the tertiary amine. For instance, an improvement of the reaction condition is proposed in Japanese Unexamined Patent Publication No. 35300/1975, in which the above-mentioned esterification is made in the presence of pyridine at a low temperature of 20° to 40° C. to esterify most of the phosphonitrilic chloride oligomer and the reaction mixture is then aged at a temperature of 20° to 50° C., and if necessary, is further aged at an elevated temperature of 40° to 80° C., to completely substitute an alkoxyl group for chlorine. However, this process has the defects that it is not efficient and also the amount of the residual chlorine is large, though the reaction at a low temperature for a long period of time is effective for inhibiting the condensation due to pyridine. If the reaction is conducted so as to decrease the amount of residual chlorine, namely to increase the conversion into alkoxyl groups, this causes undesirable results such as occurrence of excess condensation, high viscosity of the reaction product and low yield.

Also, in the above-mentioned process using a tertiary amine as a hydrogen halide acceptor, the tertiary amine is used in an excess amount to halogen of halophosphazenes. The used amine is recovered in the form of the corresponding hydrogen halide salt and neutralized with an alkali metal hydroxide, and after dehydration and distillation, it is reused. However, the costs of equipment for the recovery and of the alkali metal hydroxide run up in the industrial preparation. Also, the recovery of the unreacted alcohol is impossible. Therefore, the rise in price of the product is unavoidable.

On the other hand, a process using an inexpensive alkali metal carbonate as a hydrogen chloride acceptor instead of the tertiary amine is proposed, as known from Japanese Examined Patent Publication No. 7693/1966 in which a mixture of phosphonitrilic chloride trimer and tetramer is dissolved in benzene and is refluxed for about 20 hours, while introducing a slurry of an alkali metal carbonate and an alcohol. The conversion of chlorine of the chlorophosphazenes into an alkoxy group is at most 95% at the time when the generation of the produced carbon dioxide is completed. However, since several percents of active chlorine which directly bonds to the phosphazenes remain, the product is subject to hydrolysis and accordingly is poor in stability.

Further, it is known, as disclosed in H. R. Allcock, Phosphorusnitrogen Compounds, 150(1972) issued from Academic Press INC., New York, to prepare polyalkoxyphosphazenes by reacting phosphonitrilic halide oligomers with alkali metal alkoxides. This process has the advantages that the polyalkoxyphosphazenes are produced in high yields and the polycondensation reaction scarcely occurs and accordingly the esterification of the oligomers proceeds sufficiently. However, it is difficult to prepare the condensed product by this process. Also, the alkoxide is expensive and accordingly it costs the obtained product dear.

It is a primary object of the present invention to provide a process for preparing condensed polyalkoxyphosphazenes in high yields from cyclic and/or linear phosphonitrilic halide oligomers, which is easily applicable to the industrial preparation thereof.

A further object of the present invention is to provide a process for preparing condensed polyalkoxyphosphazenes, of which the content of the unreacted residual active halogen is not more than 0.5% and which is very stable against hydrolysis, despite of using an inexpensive alkali metal carbonate as a primary hydrogen halide acceptor.

Another object of the present invention is to provide a process for preparing condensed polyalkoxyphosphazenes having desired molecular weight and viscosity, a low concentration of residual active halogen and a high quality at a low cost with ease by a substantially two stage reaction system in which partial esterification of phosphonitrilic halide oligomers with an alcohol and condensation by dealkylhalogenation are conducted in a high efficiency in the first stage till a desired degree of condensation is obtained and almost complete and selective alkoxylation of the condensed product is conducted for a short period of time in the second stage without accompanying the condensation due to the residual active halogen.

These and other objects of the present invention will become apparent from the description hereinafter.

SUMMARY OF THE INVENTION

In accordance with the present invention, there is provided a process for preparing a condensed polyalkoxyphosphazene which comprises the steps of (A) reacting a phosphonitrilic halide oligomer with an alcohol in the presence of an alkali metal carbonate to produce a condensed partially alkoxy-substituted phosphazene, said phosphonitrilic halide oligomer being a cyclic oligomer, a linear oligomer or the mixture thereof, (B) removing water from the reaction mixture containing the condensed partially alkoxy-substituted phosphazene, and (C) reacting the condensed partially alkoxy-substituted phosphazene with at least an equimolar amount of an alkali metal alkoxide based on the residual active halogen of the condensed partially alkoxy-substituted phosphazene.

The process of the present invention can more economically provide the desired product of a stable high quality as compared with the before-mentioned conventional processes using a tertiary amine or an alkali metal carbonate as a hydrogen halide acceptor.

The condensed polyalkoxyphosphazenes prepared by the process of the present invention include noncondensed polyalkoxyphosphazenes.

DETAILED DESCRIPTION

Various known phosphonitrilic halide oligomers can be employed as a starting material in the present invention, e.g. a cyclic phosphazene oligomer containing predominantly crystalline trimer and tetramer as disclosed in Japanese Unexamined Patent Publication No. 145394/1979 and No. 145395/1979, a linear phosphazene oligomer as disclosed in Japanese Unexamined Patent Publication No. 143796/1977, a mixture of these cyclic oligomer and linear oligomer. The oligomers used in the present invention may be a crude product containing impurities or a purified product such as a cyclic phosphazene trimer. Representative example of the oligomer is a mixture of cyclic chlorophosphazene trimer and tetramer.

The alcohols used in the present invention are not particularly limited, and include, for instance, a saturated aliphatic alcohol such as ethanol, n-propanol, isobutanol, pentanol or octanol, an unsaturated aliphatic alcohol such as allyl alcohol or methylpentenol, a phenol compound such as phenol or cresol, an aralkyl alcohol such as benzyl alcohol, an alicyclic alcohol such as cyclohexanol, a halogenated alcohol such as trifluoroethanol or bromophenol, a heterocyclic alcohol such as furfuryl alcohol, and the like. Dihydric alcohols may also be employed in accordance with the purposes as well as the above-mentioned monohydric alcohols.

Examples of the alkali metal carbonate used in the first step of the process of the present invention are, for instance, potassium carbonate, sodium carbonate, and a mixture thereof. The use of potassium carbonate is preferred, since the reaction rate is higher somewhat than sodium carbonate, thus the reaction time can be shortened by 20 to 30% at the same reaction temperature, and since the residual active halogen concentration can be decreased to a lower concentration than sodium carbonate.

The esterification of a phosphonitrilic halide oligomer with an alcohol in the first step of the process of the invention is carried out in a solvent. The excess of an alcohol used as a reactant serves as a reaction solvent. In addition to the alcohol, other solvents may be employed. It is necessary that such an additionally employed solvent is a compound not having active hydrogen which reacts with the phosphonitrilic halide oligomer in the presence of the alkali metal carbonate and not inhibiting the reaction of the oligomer and alcohol. A solvent capable of forming an azeotropic mixture with water is preferable, since water produced in the system can be easily distilled away in the form of an azeotropic mixture in the latter stage of or after the completion of the reaction of the first step. The unreacted alcohol which remains after the completion of the reaction in the first step serves as a component of the azeotropic mixture to distil away water. Preferable examples of the solvent used in the first step of the process of the invention are, for instance, benzene, toluene, xylene, monochlorobenzene, diisopropyl ether, tetrahydrofuran and dioxane.

The alkali metal alkoxides used in the third step of the process of the invention are prepared by adding an alkali metal such as metallic sodium or metallic potassium to desired alcohols. Although the concentration of the alkali metal alkoxide in the alcohol solution used in the reaction varies depending on the kind of the alkoxide, it is usually selected from 10 to 30%. The amount of the alkoxide is at least one equivalent, especially from 1.1 to 1.5 equivalents, to the active halogen remaining in the reaction product of the first step, namely the partially alkoxy-substituted phosphazene. The alkoxide is usually employed in the form of an alcohol solution. The alcohol may be the same as or different from the alcohol used in the first step.

The process of the present invention will be explained below in detail.

In the first step, a phosphonitrilic halide oligomer is reacted with an alcohol in the presence of an alkali metal carbonate to partially substitute an alkoxyl group for the halogen of the oligomer. A predetermined amount of the alcohol is added to a reactor, if necessary, with the before-mentioned solvent. The alcohol is employed in an amount of at least one mole per mole of the phosphonitrilic halide unit of the oligomer. The alkali metal carbonate is then dispersed in the alcohol. The alkali metal carbonate is usually employed in an amount of about 0.5 to about 2.0 moles per mole of the phosphonitrilic halide unit of the oligomer. A solution of the phosphonitrilic halide oligomer in a solvent is added dropwise to the reactor, preferably with stirring under reflux. Solvents inert to the halogen of the oligomer and not inhibiting the esterification reaction, as mentioned before, are employed as solvents for the oligomer. It is desirable that the reaction temperature is between 60° C. and the boiling point of the reaction medium used (usually at most about 140° C.), especially from 90° to 115° C. The reaction may be carried out at a temperature lower than 60° C., but in general the reaction efficiency is bad. The dropwise addition of the oligomer solution is preferably made over 0.5 to 3 hours, but the addition time is not particularly limited thereto.

In the first step, both the esterification reaction of the oligomer with an alcohol and the condensation reaction of the oligomer accompanying elimination of an alkyl halide take place, and the oligomer loses the halogen by these two reactions. The conversion at about 8 hours after starting the dropwise addition usually reaches about 85%. It is considered that the esterification reaction is the main reaction in this time period. Thereafter, the rate of the esterification reaction becomes very slow. The conversion can be determined by fixing the unsubstituted residual active halogen with an alkoxide and measuring the halogen concentration by means of potentiometric titration. The reaction of the first step is finished at the time when the experientially desired esterification and condensation of the oligomer are attained. This time for finishing the reaction can be determined by the residual active halogen concentration in the reaction product, and the reaction is finished when the conversion calculated from the residual active halogen concentration reaches 60 to 90%. At that time, the residual active halogen concentration falls within the range of 6 to 25% by weight. When the reaction is further continued after the conversion reaches 90%, the rate of lowering of the residual active halogen concentration is very low and the esterification reaction scarcely proceeds, though the condensation proceeds. If the reaction of the first step is finished at the time when the residual active halogen concentration is high, a condensed polyalkoxyphosphzene having a low degree of condensation, namely having a low molecular weight and a low viscosity, is generally obtained. On the other hand, if the reaction is conducted at a high temperature for a long period of time until the residual active halogen concentration becomes low, the degree of condensation of the obtained polyalkoxyphosphazene is large and the condensed polyalkoxyphosphazene having a high molecular weight and a high viscosity is obtained. It is uneconomical to finish the reaction of the first step at the time when the conversion is less than 60%. On the other hand, continuing the reaction till the conversion exceeds 90% results in coloration of the reaction product and lowering of the yield. The reaction product so obtained in the first step is a condensed partially alkoxy-substituted halophosphazene oligomer and may contain a noncondensed alkoxy-substituted halophosphazene oligomer.

After the completion of the reaction of the first step, the produced water is removed, since it hinders the reaction with an alkali metal alkoxide in the next third step. Water is removed usually by distilling away the reaction solvent from the reaction mixture obtained in the first step. From this point of view, the reaction in the first step is preferably carried out in a solvent capable of forming an azeotropic mixture with water, e.g. an alcohol used in excess amounts so as to serve as a solvent or other solvents capable of forming the azeotropic mixture such as chlorobenzene. The solvent distilled away from the reaction mixture in the second step can be reused after dehydration by distillation.

After the completion of the procedure in the second step, an alkali metal alkoxide previously prepared in a usual manner is added to the reaction product, usually in the form of an alcohol solution. The reaction is carried out for 15 minutes to 1 hour with stirring, preferably under reflux. The reaction temperature is from 50° to 120° C., especially 80° to 115° C. The reaction in the third step is completed in a relatively short period of time and the alkoxy-substitution for the residual halogen almost selectively occurs. Occurrence of the condensation is of a negligible extent as compared with the alkoxy-substitution. The alkoxide is employed in an amount of at least one equivalent, preferably 1.1 to 1.5 equivalents, to the residual active halogen of the partially alkoxy-substituted phosphazene obtained in the first step, whereby the reaction can be easily completed in a relatively short period of time. Moreover, the residual halogen concentration of the final product can be decreased to a very low concentration, at most 0.5%, usually at most 0.3%. Also, since water is previously removed and the reaction is completed in a relatively short period of time, excessive condensation and hydrolysis as seen in the case where the reaction in the first step is conducted at a high temperature till the conversion exceeds 90%, do not occur. After the completion of the reaction, the solvent is distilled away under reduced pressure from the reaction mixture to give the desired product. The solvent is recovered and reused as it is.

According to the process of the present invention, a polyalkoxyphosphazene having a desired average molecular weight and viscosity can be obtained by suitably selecting the condition and end point of the reaction in the first step in which the esterification and condensation take place, thereby producing a partially alkoxy-substituted polyphosphazene having a desired average molecular weight and viscosity, and then reacting the product with an alkali metal alkoxide in the third step in which the esterification mainly occurs.

The molecular weight of the final product varies depending on the kind of the introduced alkoxyl group and the molecular weight of the phosphonitrilic halide oligomer used as the starting material of the formula: $+N=PX_2\frac{1}{n}$ wherein X is a halogen, namely depending on the introduced alkoxyl group and the average number n. For instance, in case of introducing propoxy group into the oligomer, it is desirable to control the reactions of the first and third steps so that the molecular weight of the obtained polypropoxyphosphazene is from 700 to 1,200 when the average number n of the starting oligomer is 3, from 900 to 1,500 when n is 4, and from 1,100 to 2,000 when n is 5 or more. Also, in case that the introduced alkoxyl group is other than propoxy group, the above exemplified ranges of the molecular weight vary in accordance with the introduced alkoxyl group. However, the average molecular weight of the obtained polyalkoxyphosphazene is not limited to the above ranges.

The process of the present invention is economically very advantageous from industrial point of view, since the reaction is carried out in two stages and accordingly the large portion of the raw materials can be replaced by inexpensive alcohol and alkali metal carbonate as compared with a conventional process using an alkali metal alkoxide, and has the advantages that since the reaction of the first step and the reaction of the third step are divided, the polyalkoxyphosphazene having the desired degree of condensation can be efficiently obtained by suitably controlling the respective reactions and also the condensed polyalkoxyphosphazene having two or more kinds of different alkoxy substituents can be easily obtained.

Further, the process of the present invention has the advantage that the reaction control is easy as compared with a conventional process using a tertiary amine such as pyridine as a hydrogen halide acceptor. In case of esterifying a phosphonitrilic halide oligomer with an alcohol in the presence of a tertiary amine as a hydrogen halide acceptor, if conditions of high reaction temperature and long reaction time are adopted in the latter stage of the reaction in order to sufficiently lower the residual active halogen concentration of the product, the condensation reaction also exceedingly proceeds inevitably, and consequently the demands, i.e. low halogen concentration and proper condensation, can not be attained simultaneously. In contrast, according to the process of the present invention, these demands can be readily attained by selecting the end point of the reaction in the first step.

Also, whereas a conventional process using a tertiary amine has the defect that it requires labor and high cost in recovering the tertiary amine from the by-produced hydrogen halide salt of the tertiary amine and is industrially disadvantageous, the process of the present invention is industrially very advantageous, since the by-produced salts can be readily separated by filtration and washing and also the solvent can be readily recovered in a low cost and reused by distilling away the solvent from a reaction mixture and distilling the separated solvent to dehydrate.

The present invention will be more specifically described and explained by means of the following Examples, in which all % are by weight unless otherwise noted. It is to be understood that the present invention is not limited to the Examples and that various changes and modifications may be made in the invention without departing from the spirit and scope thereof.

The following Reference Example is presented to illustrate an instance of the preparation of a phosphonitrilic halide oligomer as used in the process of the present invention as the starting material.

REFERENCE EXAMPLE

A one liter four necked flask equipped with a reflux condenser, a thermometer, a stirrer and a dropping funnel for phosphorus trichloride was charged with 500 ml. of monochlorobenzene, 36.5 g. (0.68 mole) of ammonium chloride and 0.5 g. of zinc oxide. They were admixed to give a dispersion. The dispersion was heated to 130° C., and 85.1 g. of phosphorus trichloride was added dropwise to the dispersion at a rate of 0.89 g./minute over 96 minutes under reflux, while feeding 45.4 g. of chlorine gas at a rate of 0.47 g./minute over 96 minutes. After the completion of the supply of phosphorus trichloride and chlorine gas, the reaction mixture was further refluxed at 132° C. for 144 minutes to complete the reaction.

The reaction mixture was filtered with suction to remove the unreacted ammonium chloride. The filtrate was then concentrated by an evaporator to give a 40% monochlorobenzene solution of phosphonitrilic chloride oligomers. The obtained oligomers were 70.4 g. as a solid matter and contained 97% of the cyclic oligomers and 3% of the linear oligomers. The yield of the reaction product was 98.1% on the basis of phosphorus trichloride. The ratio of the trimer to the tetramer in the cyclic oligomer component was about 80:20 by weight. Also, the ratio of the cyclic trimer and tetramer to the higher cyclic oligomers of not less than pentamer in the cyclic oligomer component was 94.5:5.5 by weight.

EXAMPLE 1

A one liter four necked flask equipped with a reflux condenser, a thermometer, a stirrer and a dropping funnel was charged with 180 g. (3 moles) of n-propanol and 152 g. of potassium carbonate, and they were stirred under reflux. The reaction was then carried out at a temperature of 95° to 96° C. for 8 hours, while adding 290 g. (1 mole of phosphonitrilic chloride unit) of the 40% monochlorobenzene solution of phosphonitrilic chloride oligomers obtained in the Reference Example over 3 hours. The reaction mixture was allowed to stand at room temperature over night. The residual active chlorine concentration of the product was 12.2%.

From the reaction mixture, excess n-propanol, monochlorobenzene and water produced in the reaction were distilled away at a temperature of 70° to 90° C. under reduced pressure. This distillation took 2 hours.

To the residue was added 205 g. of a 20% n-propanol solution of sodium n-propoxide (41 g. of sodium n-propoxide), and the reaction was carried out at about 100° C. for 30 minutes under reflux. After the completion of the reaction, n-propanol was distilled away at a temperature of 70° to 90° C. under reduced pressure. This distillation took 1 hour. After washing the residue with 200 ml. of monochlorobenzene and 400 ml. of water and separating the water layer, 50 ml. of water was further added to the organic solvent layer and sufficiently stirred. The water layer was adjusted to pH 8.2 with hydrochloric acid and then separated. To the organic layer was added 50 g. of anhydrous sodium sulfate, and it was allowed to stand for 5 hours to dehydrate. The organic layer was filtered and monochlorobenzene was then distilled away under reduced pressure of 1 mmHg. to give 127 g. of a light yellow liquid product. The average molecular weight of the product measured by an osmotic pressure method was 1,100.

Judging from the average molecular weight and infrared absorption spectrum, it is considered that the product is a condensed polypropoxyphosphazene having the P—O—P bond which corresponds to

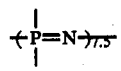

in average.

The residual active chlorine concentration of the product was 0.15%, which was measured by reacting the residual chlorine with alcoholic soda and conducting potentiometric titration with 0.1 N silver nitrate. The conversion calculated from the residual chlorine was 99.8%. The yield of the product regarded as a polypropoxyphosphazene of

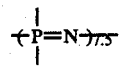

containing P—O—P bond was about 86.6%. The viscosity of the product was 2,700 cP at 25° C.

EXAMPLE 2

The procedure of Example 1 was repeated except that 348 g. of n-heptyl alcohol was employed instead of n-propyl alcohol and a solution of 69 g. of sodium n-heptoxide in 276 g. of tetrahydrofuran was employed as an alkali metal alkoxide, to give 209 g. of light yellow viscous liquid. The product had an average molecular weight of 1,250, a residual active chlorine concentration of 0.2% and a viscosity of 3,500 cP at 25° C. The yield was 99.7%.

EXAMPLE 3

To the same four necked flask as used in Example 1 were added 282 g. of phenol, 207 g. of potassium carbonate and 150 ml. of monochlorobenzene. The reaction was carried out at a temperature of 93° to 98° C. for 10 hours under reflux, while adding dropwise to the flask 290 g. of a 40% monochlorobenzene solution of phosphonitrilic chloride oligomers obtained in Reference Example. After the completion of the reaction, the reaction mixture was aged by allowing to stand at room temperature over night. The residual active chlorine concentration of the product was 18%.

After distilling away monochlorobenzene and water produced in the reaction, 445 g. of tetrahydrofuran solution containing 89 g. of sodium phenoxide was added to the residue and the reaction was carried out at 65° C. for 40 minutes under reflux.

The unreacted phenol was distilled away under reduced pressure to recover. The product was washed with water, neutralized and washed again with water in the same manner as in Example 1, and the organic layer was separated. The organic layer was dried under reduced pressure over night to give yellowish brown high viscous liquid. The residual active chlorine concentration of the product was 0.37% and the yield was 99.4%.

EXAMPLE 4

To the same four necked flask as used in Example 1 were added 180 g. of n-propanol and 159 g. of sodium carbonate. The reaction was carried out at 96° C. for 12 hours, while adding dropwise to the flask 290 g. of a 40% monochlorobenzene solution of phosphonitrilic chloride oligomers obtained in Reference Example. The residual active chlorine concentration of the product was 19.4%.

Monochlorobenzene, n-propanol and water produced in the reaction were distilled away from the reaction mixture. The distillation took about 2 hours.

To the residue was added 472 g. of a 20% solution of sodium allylate in a benzene-allyl alcohol mixed solvent, and the reaction was carried out at 87° C. for 1 hour under reflux.

The reaction mixture was then washed with a saturated aqueous solution of Glauber's salt several times, and dried to give a yellow viscous liquid. The presence of double bond was observed in the product by IR and NMR analyses. Also, the ratio of propoxy group to allyloxy group in the product was about 2:1. The residual active chlorine concentration of the product was 0.0023%.

In addition to the ingredients used in the Examples, other ingredients can be used in the Examples as set forth in the specification to obtain substantially the same results.

What we claim is:

1. A process for preparing a condensed polyalkoxyphosphazene which comprises the steps of (A) reacting a phosphonitrilic halide oligomer with an alcohol in a solvent in the presence of an alkali metal carbonate to produce a condensed partially alkoxy-substituted phosphazene having a residual active halogen concentration of 6 to 25% by weight, the phosphonitrilic halide oligomer being a cyclic oligomer, a linear oligomer or the mixture thereof, (B) removing water from the reaction mixture containing the condensed partially alkoxy-substituted phosphazene by distillation, and (C) reacting the condensed partially alkoxy-substituted phosphazene with an excess amount of an alkali metal alkoxide based on the residual active halogen of the condensed partially alkoxy-substituted phosphazene in a solvent at a temperature of 50° to 120° C.

2. The process of claim 1, wherein the reaction of the step (A) is carried out at a temperature between 60° C. and the boiling point of the solvent, and water was distilled away together with the solvent in the step (B).

3. The process of claim 1, wherein the alkali metal alkoxide is employed in an amount of 1.1 to 1.5 equivalents based on the residual active halogen of the condensed partially alkoxy-substituted phosphazene and the residual active halogen concentration of the resulting condensed polyalkoxyphosphazene is not more than 0.5% by weight.

4. The process of claim 1, wherein the solvent in step (A) is one not having active hydrogen which reacts with the phosphonitrilic halide oligomer and capable of forming an azeotropic mixture with water.

5. The process of claim 1, wherein the solvent in step (A) is a member selected from the group consisting of benzene, toluene, xylene, monochlorobenzene, diisopropyl ether, tetrahydrofuran and dioxane.

6. The process of claim 1, wherein the solvent in step (A) is excess of the alcohol.

7. The process of claim 1, wherein the solvent in step (A) is a mixture of excess of the alcohol and a solvent not having active hydrogen which reacts with the phosphonitrilic halide oligomer and capable of forming an azeotropic mixture with water.

8. The process of claim 1, wherein the solvent in step (A) is a mixture of excess of the alcohol and a member selected from the group consisting of benzene, toluene, xylene, monochlorobenzene, diisopropyl either, tetrahydrofuran and dioxane.

9. The process of claim 1, wherein the solvent in step (C) is an alcohol corresponding to the alkali metal alkoxide.

* * * * *